United States Patent
Del Grosso et al.

(10) Patent No.: US 6,869,227 B2
(45) Date of Patent: *Mar. 22, 2005

(54) OPTICAL POLARITY MODULES AND SYSTEMS

(75) Inventors: Steven C. Del Grosso, Moorseville, NC (US); Larry K. Shook, Jr., Hudson, NC (US); Alan W. Ugolini, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/805,892

(22) Filed: Mar. 22, 2004

(65) Prior Publication Data

US 2004/0184741 A1 Sep. 23, 2004

Related U.S. Application Data

(63) Continuation of application No. 10/256,799, filed on Sep. 27, 2002, now Pat. No. 6,758,600.

(51) Int. Cl.[7] ................................................ G02B 6/38
(52) U.S. Cl. ......................................................... 385/71
(58) Field of Search ............................. 385/59, 65, 71, 385/80, 83, 46, 49, 50, 114, 115, 120, 121, 137

(56) References Cited

U.S. PATENT DOCUMENTS

| 4,611,887 A | 9/1986 | Glover et al. ............. 350/96.21 |
| 4,699,460 A | 10/1987 | Szentesi ................... 350/96.21 |
| 6,219,479 B1 | 4/2001 | Madden et al. ................ 385/46 |
| 6,402,393 B1 | 6/2002 | Grimes et al. ................ 385/89 |
| 6,554,483 B1 | 4/2003 | Sun et al. ...................... 385/59 |

*Primary Examiner*—Khiem Nguyen

(57) ABSTRACT

A universal breakout harness for reversing the polarity of optical fibers includes a multi-fiber connector having a plurality of optical paths, an optical ribbon having a plurality of optical fibers disposed in the optical paths of the multi-fiber connector, and a plurality of optical fiber connectors opposite the multi-fiber connector defining a plurality of pairs of optical fiber paths. The optical fibers are separated and routed between the optical paths of the multi-fiber connector and the pairs of optical paths defined by the plurality of optical fiber connectors such that the optical fibers in at least one of the pairs of optical paths are selected from optical fibers disposed in optical paths of the multi-fiber connector that are not immediately adjacent to each other. The universal breakout harness is used in methods of implementing reverse-ribbon positioning in a cabling system and transitioning ribbon cabling into multiple duplex systems.

11 Claims, 4 Drawing Sheets

OPTICAL POLARITY MODULES AND SYSTEMS

CROSS-REFERENCE TO RELATED APPLICATION

This application is a continuation of U.S. patent application Ser. No. 10/256,799, filed Sep. 27, 2002, now U.S. Pat. No. 6,758,600.

FIELD OF THE INVENTION

The present invention relates to optical fiber interconnection modules, for example, to interconnection modules for use in a local area network (LAN).

BACKGROUND OF THE INVENTION

Conventional fiber optic cables comprise optical fibers that conduct light which is used to transmit voice, video, and data information. An optical ribbon includes a group of optical fibers that are coated with a ribbon common layer, which common layer may be of the ultraviolet (UV) light curable type. Typically, such a ribbon common layer is extruded about a group of individually colored optical fibers that have been arranged in a planar array, and is then irradiated with a UV light source that cures the ribbon common layer. The cured ribbon common layer protects the optical fibers and generally aligns the respective positions of optical fibers in the planar array. Optical fiber ribbons can be connected to multi-fiber connectors, for example, MTP connectors. MTP connectors can be used in LAN applications, for example, data centers and parallel optics interconnects between servers.

The present invention addresses the need for a fiber optic interconnection solution for MTP connectors in the LAN environment. Conventional networking solutions, which utilize a 12-fiber MTP connector assembly, for example, are configured in a point to point system. Fiber polarity, i.e., based on a given fiber's transmit to receive function in the system, is addressed by flipping fibers in one end of the assembly just before entering the MTP connector in an epoxy plug, or by providing "A" and "B" type break-out modules where the fiber is flipped in the "B" module and straight in the "A" module.

System problems can occur when the MTP assembly is used in an interconnect construction. Fiber polarity is taken back out of the system when MTP assemblies are interconnected. FIG. 1 illustrates a conventional module "A" having six fiber pairs matched as follows: 1-2; 3-4; 5-6; 7-8; 9-10; and 11-12. All of the fiber pairs are defined by fibers that are immediately adjacent to at least one other in the optical fiber ribbon. The immediate fiber pairs are routed to multi-fiber or single-fiber connectors 13 within module A; 1 is immediately adjacent to 2, 3 next to 4, and so on. Module A is used in a system utilizing an "A" and "B" type module approach where the fibers in the "B" module are flipped with respect to module A to address, or correct for, fiber polarity. Conventionally, MTP connectors are mated key up to key down.

In an effort to reduce implementation confusion, complexity and stocking issues with the "A" and "B" module method, or fiber flipping before entering the connector, the idea of wiring a module in a fiber sequence according to the present invention has been devised. Wiring a module in accordance with the present invention eliminates the need for an "A" and "B" module approach where the module according to the present invention is used universally in the system.

SUMMARY OF THE INVENTION

An optical interconnection module having: an enclosure defining walls and a cavity within the walls for receiving and supporting optical fibers and connectors; an optical interconnection section formed in a wall of the module, the optical interconnection section having a multi-fiber connector with multiple optical paths formed therein, the optical paths being arranged in a generally planar array with the paths being immediately adjacent to at least one other optical path for optical alignment with optical fibers in an optical fiber ribbon; an optical connector station formed in a wall of the module having a plurality of optical fiber connectors; the optical paths and the optical connectors being optically interconnected by optical fibers disposed in the cavity, fiber pairs being formed by the optical fibers, at least one of the fiber pairs being routed to a respective connector station that is in optical communication with the optical paths.

In another aspect, an optical assembly, having: at least two optical interconnection modules; the modules being optically interconnected by optical paths, the optical paths being established through connectors and adapters having respective keys being positioned in the same place on the connectors, and optical fiber ribbons; the connectors and adapters being mated with keys in the same relative position; and polarity of the optical fibers located externally of the modules is not reversed.

BRIEF DESCRIPTION OF THE DRAWING FIGURES

DETAILED DESCRIPTION OF THE INVENTION

Figure 1:
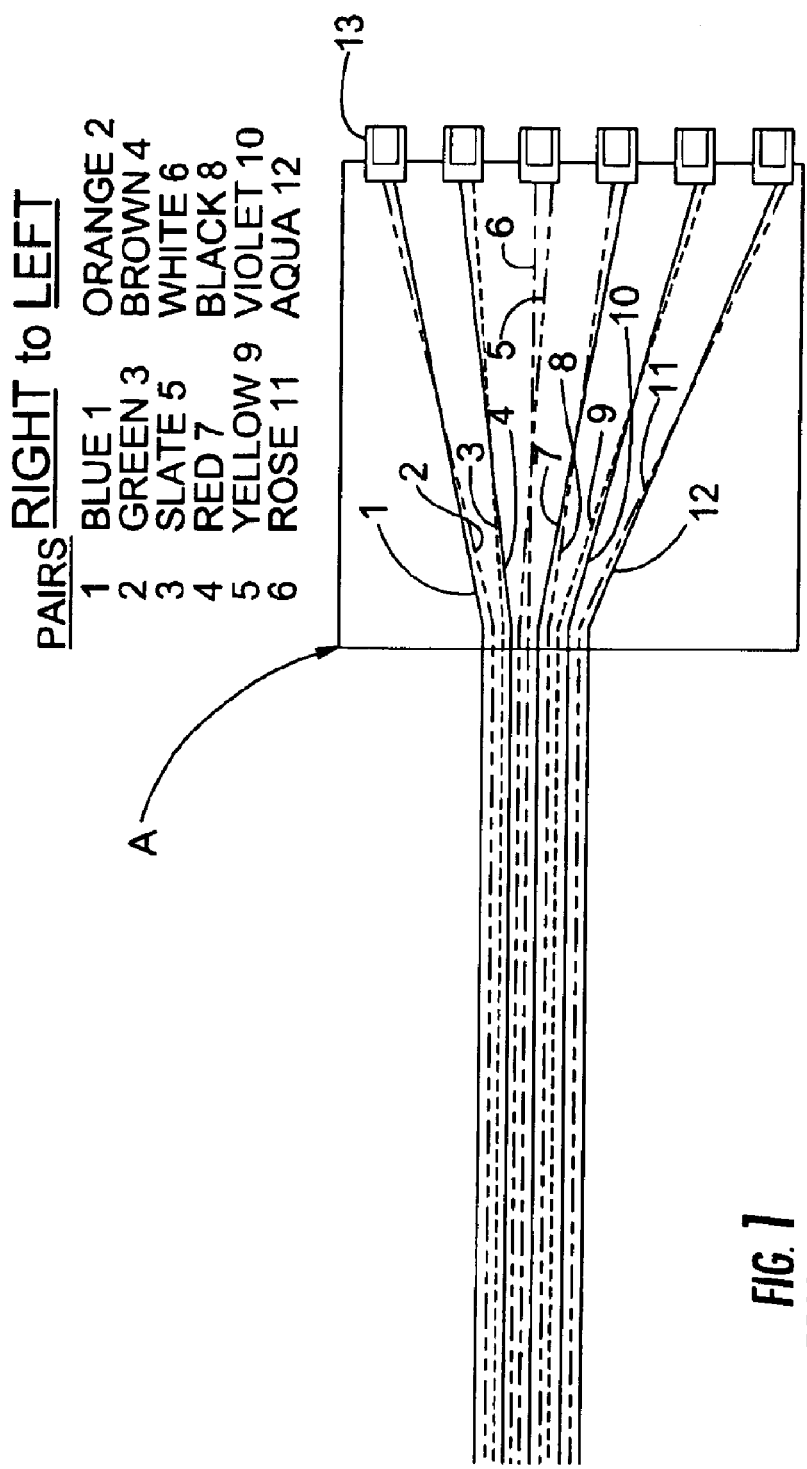
FIG. 1 is a schematic view of a conventional module.
Figure 2:
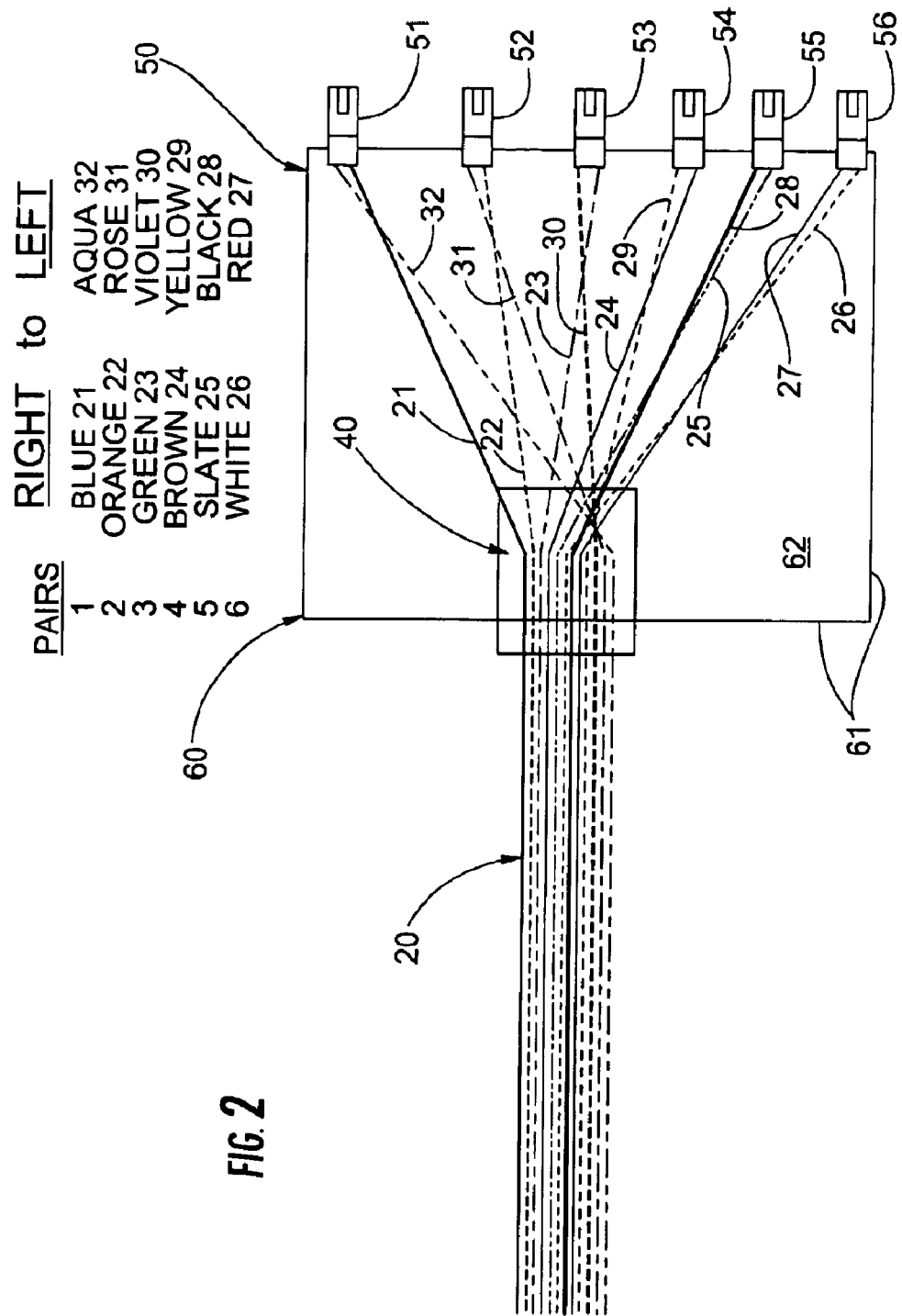
FIG. 2 is a schematic view of a breakout harness with a module according to the present invention.

An embodiment of the present invention is an optical networking module for use with an optical fiber ribbon, for example having twelve optical fibers, connected to an MTP or MPO optical connector. FIG. 2 illustrates an exemplary module 60 according to the present invention. Module 60 is optically associated with an optical fiber ribbon 20, for example, having twelve distinctly colored optical fibers 21–32 disposed in a matrix.

Module 60 includes an enclosure defining walls 61 and a cavity 62 within the walls for receiving and supporting optical fibers and connectors.

Module 60 also includes an optical interconnection section having an optical connector. The preferred connector is an MTP or MPO connector 40. Connectors 40 are epoxy and polish compatible multi-fiber connectors, for example, part of Corning Cable Systems' LANScape® solution set. The epoxy and polish connector is a twelve-fiber connector achieving very high density in a small space, it contains multiple optical paths, the optical paths being arranged in a generally planar array. The optical paths being immediately adjacent to at least one other optical path for optical alignment with the optical fibers in an optical fiber ribbon. The MTP connector is designed for multi-mode or single-mode applications, and uses a push/pull design for easy mating and removal. The MTP connector can be the same size as a conventional SC connector but provides twelve times the fiber density, advantageously saving cost and space. The MTP connector includes a key for proper orientation for registration with any required optical adapters. An optical connector adapter 41 (FIGS. 3 and 4) can be disposed between the connector outside the module and a connector inside the module. Other connection schemes can be used, however. Preferably, a ribbon fan-out kit is used to manage the optical fibers from between the connector inside the module and the connector stations.

FIG. 2 illustrates an exemplary fiber wiring scheme for routing of optical fibers from connector 40 to single or multi-fiber connectors located at connector stations 51–56, defined at a break-out section 50 of module 60. Each connector station 51–56 preferably includes one or more connectors. In the module, an exemplary routing scheme is the following: fiber number 1 (blue) is paired with fiber number 12 (aqua); fiber number 2 (orange) is paired with fiber number 11 (rose); fiber number 3 (green) is paired with fiber number 10 (violet); through the remaining numbers/colors of fiber with the last pair being fiber number 6 (white) with fiber number 7 (red). With reference to FIG. 2, the fiber pairs are defined as follows: 21-32; 22-31; 23-30; 24-29; 25-28; and 26-27. At least one but preferably at least 80% of the fiber pairs routed to respective connector stations 51–56 are made by fibers not immediately adjacent in the optical fiber ribbon 20. In other words, the optical paths of connector 40 and the optical connectors at stations 51–56 are optically interconnected by optical fibers disposed in cavity 62 of the module 60, the fiber pairs being formed by the optical fibers. At least one of the fiber pairs being in optical communication with respective optical paths in connector 40 and being routed to a respective connector station, the at least two optical paths being selected from optical paths not being immediately adjacent to each other. Preferably, 80% of said fiber pairs optically interconnected with the optical paths are selected from optical paths not being immediately adjacent to each other.

Figure 3:
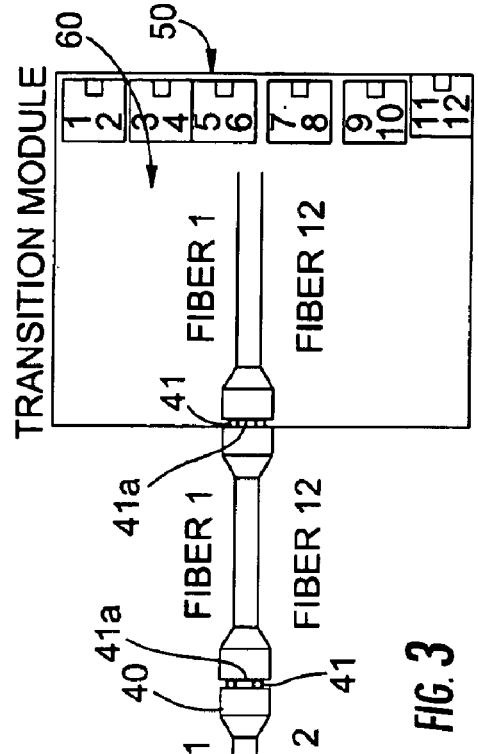
FIG. 3 is a schematic view of a first optical assembly according to the present invention.
Figure 3:
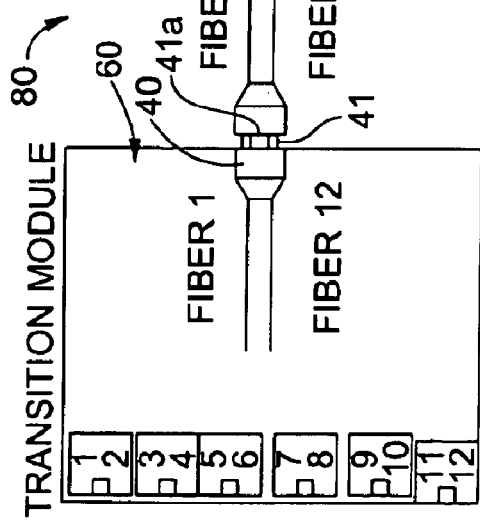
Figure 4:
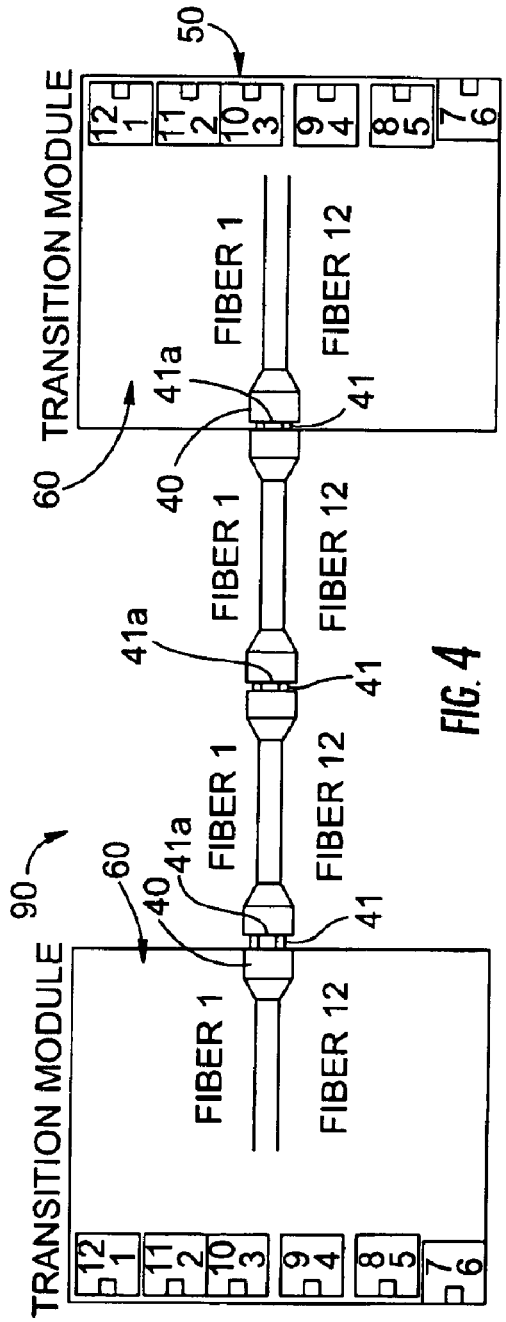
FIG. 4 is a schematic view of a second optical assembly according to the present invention.
Figure 5:
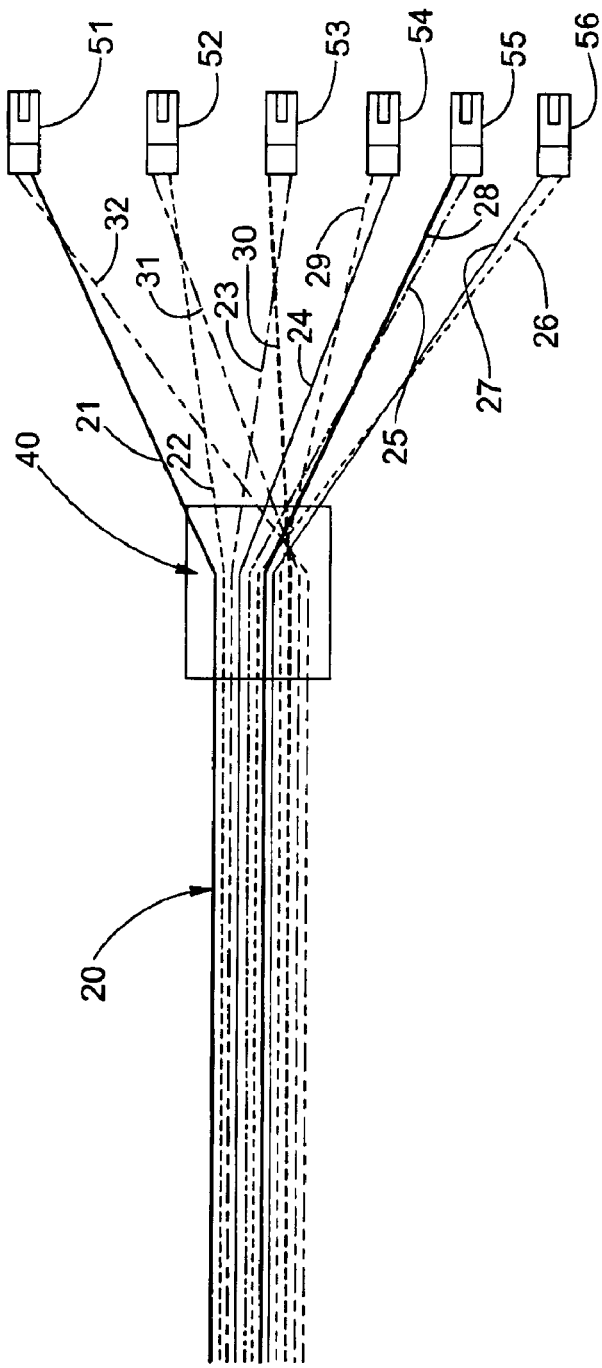
FIG. 5 is a schematic view of a breakout harness without a module according to the present invention.

Using the modules of the present inventions, interconnection of assemblies are deployable in a network, for example, a LAN. Multiple spans of assemblies can be interconnected. Fiber flips in the trunk assembly just prior to one end of the MTP connector, for polarity correction, is not necessary resulting in a complexity/cost reduction. Finally, a universal wired harness in a module eliminates the need for two different types of breakout modules in the network. The system consists of one or more MTP or MPO trunk assemblies and one (universal) type of breakout harness either loaded in a module (see FIGS. 2–4) or by itself (see FIG. 5). For example, two MPG connectors mate via an MPO adapter with the key of each MPO in the same relative position, i.e., keys up or keys down. FIGS. 3 and 4 illustrate exemplary systems 80, 90 respectively, employing modules 60 according to the present invention. Each system 80, 90 comprises MTP or MPO connectors 40 with associated adapters 41, and optical fiber ribbons 20. All MPO connectors 40 and dual fiber connectors at stations 50 are mated with keys 41*a* in the same position, i.e., all keys 41*a* up or all keys 41*a* down. In systems 80, 90, the polarity is not reversed, fibers one through twelve are not flipped between the modules. In other words, the optical paths are not flipped at the adapters or other position between the modules. For example, the optical path remains with its color, blue stays with blue (1—1), orange with orange (2—2), green with green (3—3), and so on, from one module to another including the connectors 40 externally of the modules 60.

To implement reverse-ribbon positioning in the cabling system the following steps should be taken.
  a) Assign each fiber in a given optical ribbon a sequential number, as described hereinabove.
  b) As shown in FIG. 3, install the MPO connectors 40 as follows:
    1) On one end of the cable, install an optical ribbon into the connector 40 with the fibers in consecutive numbering (e.g., 1, 2, 3, 4 . . . 12) from left to right with the key 41*a* up.
    2) On the other end of the cable, install the ribbon into the connector 40 with the fibers in reverse numbering (12, 11, 10, 9 . . . 1) from left to right with the key 41*a* up.

Transitioning the ribbon cabling into multiple duplex systems completes reverse-pair positioning. This transition can be implemented with transition modules or transition assemblies (see FIGS. 3–4), having MPO to dual-fiber connectors or duplexed single-fiber connectors. If transition assemblies are used, the positioning of the fibers inside the connectors is implemented the same as the implementation inside the respective modules.

The present invention has been described with reference to the foregoing embodiments, which embodiments are intended to be illustrative of the present inventive concepts rather than limiting. Persons of ordinary skill in the art will appreciate that variations and modifications of the foregoing embodiments may be made without departing from the scope of the appended claims.

What is claimed is:

1. A universal breakout harness for reversing the polarity of optical fibers, comprising:
   a multi-fiber connector with multiple optical paths formed therein, the optical paths being arranged in a generally planar array with each optical path being immediately adjacent to at least one other optical path;
   a plurality of optical fibers of an optical ribbon disposed in the optical paths formed in the multi-fiber connector; and
   a plurality of optical fiber connectors disposed opposite the multi-fiber connector, the plurality of optical fiber connectors defining a plurality of pairs of optical paths for receiving the optical fibers of the optical ribbon;
   wherein the optical fibers of the optical ribbon are separated and routed between the optical paths formed in the multi-fiber connector and the pairs of optical paths defined by the plurality of optical fiber connectors; and
   wherein the optical fibers in at least one of the pairs of optical paths defined by the plurality of optical fiber connectors are selected from optical fibers disposed in optical paths formed in the multi-fiber connector that are not immediately adjacent to each other.

2. The universal breakout harness of claim 1, wherein at least 80% of the optical fibers in the pairs of optical paths defined by the plurality of optical fiber connectors are selected from optical fibers disposed in optical paths formed in the multi-fiber connector that are not immediately adjacent to each other.

3. A method of implementing reverse-ribbon positioning in a cabling system, comprising:
   assigning a sequential number to each of the optical fibers of an optical ribbon;
   installing one end of the optical ribbon into a multi-fiber connector with the optical fibers of the optical ribbon arranged in sequential number from left to right; and installing the other end of the optical ribbon into a plurality of optical fiber connectors with the optical fibers of the optical ribbon arranged in reverse sequential number from left to right.

4. The method of claim 3,
wherein a plurality of optical paths are formed in the multi-fiber connector and arranged in a generally planar array with each optical path being immediately adjacent to at least one other optical path;
wherein a plurality of pairs of optical fiber paths are defined by the plurality of optical fiber connectors; and
wherein the optical fibers installed in at least one of the pairs of optical paths defined by the plurality of optical fiber connectors are selected from optical fibers installed in optical paths formed in the multi-fiber connector that are not immediately adjacent to each other.

5. The method of claim 4, wherein at least 80% of the optical fibers installed in the pairs of optical paths defined by the plurality of optical fiber connectors are selected from optical fibers installed in optical paths formed in the multi-fiber connector that are not immediately adjacent to each other.

6. The method of claim 3, wherein the multi-fiber connector has a key oriented in a predetermined direction and wherein each of the plurality of optical fiber connectors has a key oriented in the same predetermined direction.

7. A method of transitioning ribbon cabling into multiple duplex systems, comprising
providing a first transition module and a second transition module by:
assigning a sequential number to each of the optical fibers of a first optical ribbon;
installing one end of the first optical ribbon into a first multi-fiber connector having a key with the optical fibers of the first optical ribbon arranged in sequential number from left to right and the key oriented in a predetermined direction; and
installing the other end of the first optical ribbon into a plurality of optical fiber connectors with the optical fibers of the first optical ribbon arranged in reverse sequential number from left to right; and
connecting the first multi-fiber connector of the first transition module to a second multi-fiber connector installed on one end of a second optical ribbon having a plurality of optical fibers arranged in a sequential number from left to right, the second multi-fiber connector having a key oriented in the predetermined direction; and
connecting the first multi-fiber connector of the second transition module to a third multi-fiber connector installed on the other end of the second optical ribbon, the third multi-fiber connector having a key oriented in the predetermined direction.

8. The universal breakout harness of claim 1, wherein the plurality of optical fibers are identified by numbers 1 through X, where X is the total number of optical fibers in the optical ribbon, and the optical fibers are attached to the multi-fiber connector in numerical order from 1 through X and are paired for external connection to successive optical fiber connectors: 1 and X, 2 and X-1, etc., until all fibers are paired.

9. The universal breakout harness of claim 8, wherein X is equal to 12.

10. The universal breakout harness of claim 8, wherein six of the optical fiber connectors are present defining six pairs of optical paths.

11. The universal breakout harness of claim 1, wherein the optical fiber connectors include at least one multi-fiber connector.

* * * * *